United States Patent

[11] 3,625,911

| [72] | Inventors | Edward G. Redman<br>Cincinnati, Ohio;<br>Jack S. Skinner, Pittsburgh, Pa. |
|---|---|---|
| [21] | Appl. No. | 741,228 |
| [22] | Filed | June 28, 1968 |
| [45] | Patented | Dec. 7, 1971 |
| [73] | Assignee | Mobil Oil Corporation<br>Continuation-in-part of application Ser. No. 506,837, Nov. 8, 1965, now abandoned. This application June 28, 1968, Ser. No. 741,228 |

[54] POLYAMIDE/IMIDE POLYMER DERIVED FROM TRIMELLITIC ANHYDRIDE AND ORGANIC DIISOCYANATE AND THE ENAMELING OF WIRE THEREWITH
6 Claims, No Drawings

[52] U.S. Cl. ...................................................... 260/30.2,
117/132, 161/190, 260/33.6, 260/77.5, 260/78
[51] Int. Cl. ....................................................... C08g 22/04,
C08g 22/32
[50] Field of Search ............................................ 260/77.5,
78 TF, 30.2, 33.6

[56] References Cited
UNITED STATES PATENTS

| 3,022,200 | 2/1962 | Koerner et al. ............... | 200/77.5 X |
| 3,300,420 | 1/1967 | Frey .............................. | 260/77.5 X |
| 3,314,923 | 4/1967 | Muller et al. .................. | 260/78 |

*Primary Examiner*—Donald E. Czaja
*Assistant Examiner*—M. J. Welsh
*Attorneys*—Oswald G. Hayes, Donald L. Dickerson and Mitchell G. Condos ABSTRACT: Wire coating solutions are provided by reacting trimellitic anhydride with an organic diisocyanate in substantially equimolar proportions, the reaction being carried out at a moderate temperature up to about 275° F. in organic solvent solution medium to produce an amide reaction product having a single anhydride group and a single isocyanate group. The amide-forming reaction is continued until the theoretical amount of carbon dioxide is removed. The reaction product is then blocked with a monofunctional blocking agent such as phenol in order to block the isocyanate functionality and convert the anhydride functionality to a carboxy ester. Polymerization is then carried out by raising the temperature to progressively unblock the isocyanate functionality for reaction with the free carboxy groups which are available. This polymerization produces an organic solvent-soluble polyamide polymer in solution in the solvents used. When the polyamide polymer is coated on a base such as wire and baked, the phenol blocking agent is removed and insolubilization takes place primarily by imide formation.

POLYAMIDE/IMIDE POLYMER DERIVED FROM TRIMELLITIC ANHYDRIDE AND ORGANIC DIISOCYANATE AND THE ENAMELING OF WIRE THEREWITH

The present application is a continuation-in-part of our prior copending application Ser. NO. 506,837 filed Nov. 8, 1965, now abandoned.

The present invention relates to amide/imide polymers particularly adapted for the enameling of electrical wire and distinguished by their capacity to provide flexible coatings capable of resisting high temperatures. The invention includes the production of organic solvent-soluble polyamide resins which form the amide/imide polymers on baking as well as wire enamels which contain the soluble polyamide resins in organic solvent solution and the enameled wire which is produced using these enamels.

As a matter of interest, it is known that imide linkages have good high temperature properties, but they introduce brittleness into the polymer. The combination of high temperature resistance and flexibility is difficult to obtain.

In accordance with the present invention, a polymer is produced having predominately alternate amide and imide linkages and it is found that this provides good high temperature properties with minimum sacrifice in film flexiblity.

One procedure for producing the desired alternate amide and imide linkages is as follows:

Step 1. React trimellitic anhydride with an organic polyisocyanate, preferably a diisocyanate such as diphenylmethane-4,4'-diisocyanate, abbreviated herein as MDI:

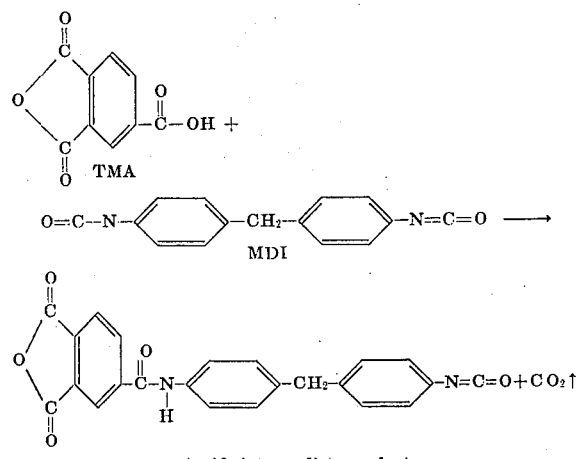

TMA

MDI

Amide intermediate product

As can be seen, this intermediate product is an amide and it possesses both a single anhydride group and a single isocyanate group.

Step 2. The amide produced in step 1 is reacted with phenol (mere cooking with mild heat) to block the same and produce:

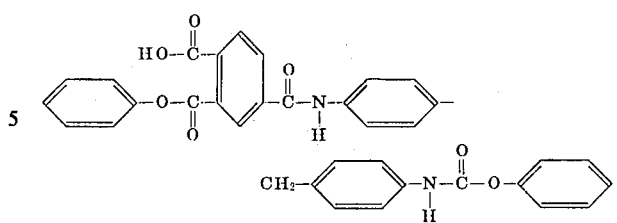

Phenol-blocked amide intermediate product

Any monofunctional blocking agent may be used so long as it is released (split off) at the reaction temperatures which are employed. In this respect, it is desired that the blocking agent be substantially completely released when the coatings are baked in the wire tower and it has been found that monohydric phenols are particularly effective in this regard. Typical phenols which may be used are illustrated by: phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isoctyl phenol, 2-chloro phenol, 2,6-dichloro phenol, 2-nitrophenol, 4-nitro phenol, and 3-nitro phenol. On the other hand, there are numerous other monofunctional blocking agents which are well known and which, while not as effective as the phenols noted above are, nonetheless, useful. Innumerable compounds falling within this class are well known and illustrated in U.S. Pat. Nos. 2,723,265 and 2,982,754.

Step 3. On heating the phenol blocked amide at 130° C. the phenol from the NCO group is removed and becomes a part of the solvent and carbon dioxide is liberated as follows to produce a solvent-soluble polyamide polymer:

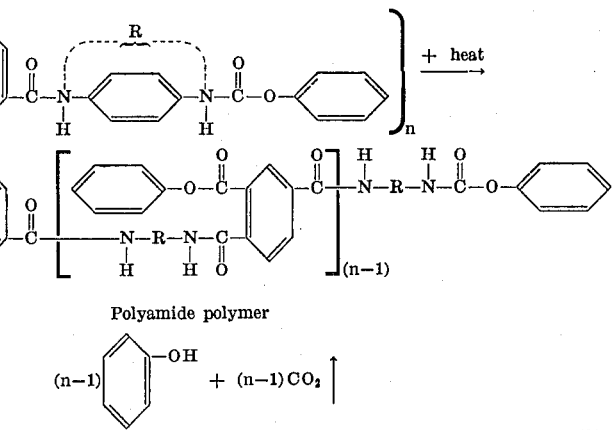

Polyamide polymer

Step 4. This polyamide polymer is insolubilized primarily by imide formation which takes place when further phenol is liberated during the final baking operation which takes place in the wire tower. In this fashion, the polyamide polymer pictured above is converted to a polymer having alternate imide and amide groups having the following structure:

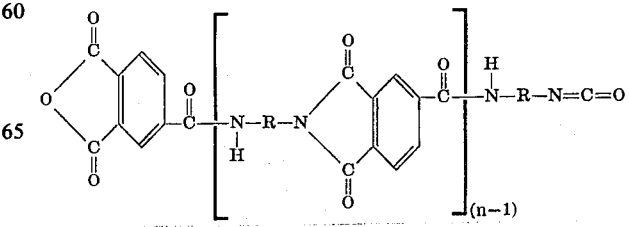

The end groups in the above formula are idealized. Moreover, and while the above structure shows the imide formation, there is also some incidental polymer growth during the baking operation as will be evident from the existence of reactive groups.

The mol ratio of trimellitic anhydride to polyisocyanate, preferably diisocyanate should be between 1/0.95 to 1/1.4, preferably from 1/0.97–1/1.3. When too little diisocyanate is used, e.g., a ratio of 1/0.90, the polymer lacks flexibility and adhesion. When too much diisocyanate is used, e.g., more than a ratio of 1/1.4, numerous properties fail, e.g., failures from heat shock, lack of flexibility and lack of toughness are all encountered.

From the standpoint of the chemistry involved, when the mole ratio of reactants is substantially 1/1, which is preferred, the product after final baking appears to consist essentially of alternate amide and imide linkages. As will be evident, as one departs from the preferred equimolar ratio, all of the linkages are not alternating amide and imide linkages, but these alternating linkages are still predominant to supply the desired new properties in combination.

Trimellitic anhydride has no known equivalents in the present development. Even the acid chloride form or the acid form of the same compound do not react in the desired order.

Equivalents for the preferred diphenylmethane-4,4'-diisocyanate are toluene diisocyanate, hexamethylene diisocyanate, meta phenylene diisocyanate, polymethylene polyphenyl isocyanate, dianisidine diisocyanate, bis-2-isocyanatoethyl-fumarate, bis-2-isocyanato-ethyl-carbonate, and bis-2-isocyanato-ethyl--hexachloronorborn-5-ene-2,3-dicarboxylate.

The preferred polyisocyanates are aromatic and, with the exception of the isocyanate groups, consist of atoms selected from the group consisting of carbon, hydrogen, and halogen atoms, the halogen atoms being optional.

Solvent is of significance to the proper conduct of the reaction since using the same materials, proportions and reaction procedure and temperature in the absence of solvent fail to produce a resin of high molecular weight as in the invention. The solvent is used in an amount to provide a solution.

The time of adding the phenol component is of importance since, if it is present at the beginning, there is produced a yellow crystalline material of no utility in wire coating instead of the soluble resin which is desired. Similarly, if phenol addition is unduly delayed, e.g., until after weight loss through carbon dioxide generation ceases, the product is again useless, e.g., it is a solid crumbly mass completely unacceptable for use as a wire coating. Moreover, if the phenol component is omitted, the final resin solution is grainy and cloudy and coatings thereof on wire tend to blister.

It is preferred to add the phenol component after about one molar proportion of carbon dioxide is liberated per mol of trimellitic anhydride, but this can be varied to some extent, e.g., after the liberation of from 0.6 to 1.2 molar proportions of carbon dioxide.

The temperature of reaction between the trimellitic anhydride and the diisocyanate should be up to about 275° F. At lower temperature the reaction is slower, but the isocyanate-acid reaction does not require very much assistance from external heat. On the other hand, temperatures much above 275° F. cause the reaction to become significantly less controllable.

While the wire enamels of the present invention are well suited to be used alone to provide flexible high temperature resistant coatings for wire, they may also be used as a topcoat to enhance the performance of other thermosetting wire enamels especially thermosetting polyester wire enamels which have been used as base coats. In this respect, the wire enamels of the invention are used in place of the conventional polyethylene terephthalate topcoats known in the prior art, the use of base coats and topcoats in the provision of an effectively enameled electrical conductor being shown in U.S. Pat. No. 3,022,200, the disclosure of which is hereby incorporated by reference.

The invention is illustrated in the following examples.

EXAMPLE 1

To a suitable reaction vessel equipped with an agitator, a charging port, a reflux condenser, a thermometer well and a heat source, there are charged 431 parts by weight of N-methyl pyrrolidone and 169 parts by weight of diphenylmethane-4,4'-diisocyanate (MDI). While under agitation, the mixture is heated to 195° F. to dissolve the MDI and 130 parts of trimellitic anhydride are added. The temperature is then raised to 255° F. and an exothermic reaction occurs. At the completion of the exotherm, the temperature is further increased to 275° F. and this temperature is maintained until a total of 29.8 parts by weight of carbon dioxide is liberated. The reaction mixture is then cooled to 255° F. and 127 parts of phenol are added. The temperature is again raised to 275° F. and held at 275° F. until a room temperature sample of the reaction medium has a viscosity in the range of approximately 6000–10,000 centipoises using a Brookfield viscosimeter. When the desired viscosity is obtained, the reaction mass is cooled to 240° F. and 143 parts by weight of Solvesso 100 are added (mixture of aromatic hydrocarbon solvents having a boiling range of from 306 to 343° F.).

There is thus produced a ready-for-use wire enamel formulation having a total determined solids of 30.5 percent and a viscosity of 3300 centipoise at 86° F. The solids determination is made using a 0.5 gram sample baked 40 minutes at 340° F.

When the above wire enamel formulation, which has all amide linkages, is coated on wire and baked, the reaction described in step 4 takes place, liberating phenol to permit imidization and the formation of a flexible, high temperature resistant wire enamel.

Data illustrating the invention is set forth in the following table which compares wire enamels made as described in example 1 except for the molar proportions identified in the table.

TABLE.—REACTION RATIO PARAMETERS

| Moles: TMA/MDI | 1/0.7 | 1/0.9 | 1/1 | 1/1.2 | 1/1.4 |
| --- | --- | --- | --- | --- | --- |
| Panel data | No flex or adhesion | No flex or adhesion | OK | OK | Not run. |
| Wire data flex [1] | Not run | Not run | 20 to 30% 1X | Pass 20% 1X, Pass 20% 3X | Pass 20% 3X, Pass 30% 3X. |
| Variable pressure cut through [2] | | | 40 to 50 lbs | 23 lbs | 14 to 22 lbs. |
| Coatability | | | 7 to 8 | 6 to 7 | 5 to 6. |
| Heat shock [3] | | | Pass | Pass | 1 crack. |

[1] Specimens elongated the percentage noted and then wrapped around a mandrel having either the same diameter as the wire wire tested or three times that diameter, as indicated.
[2] Pressure is continuously increased at the rate of 5 lbs./minute on a crossed pair of coated wires held at 290° C. until conductivity using a 10 volt circuit is obtained.
[3] One hour at 200° C.—specimens elongated 30% and wrapped on a 3X mandrel before conditioning.

1. Specimens elongated the percentage noted and then wrapped around a mandrel having either the same diameter as the wire tested or three times that diameter, as indicated.

2. Pressure is continuously increased at the rate of 5 lbs./minute on a crossed pair of coated wires held at 290° C. until conductivity using a 10–volt circuit is obtained.

3. One hour at 200° C.—specimens elongated 30 percent and wrapped on a 3X mandrel before conditioning.

In connection with the above table, the wire enamels of the invention are applied to wire in a plurality of separate coatings, each approximately one-half mil in thickness with each coating being baked prior to the application of the succeeding coating. Appropriate baking equipment for the wire is illustrated by a vertical tower having a 12-foot heating zone in an overall length of 15 feet. The temperatures within the wire tower range from 250° F. at the bottom of the heating zone to 800° F. at the top of the heating zone. The wire is moved through the tower at speeds of from 15–25 feet per minute. The table reports the result of applying six coatings on No. 18 wire for a total build of 3 mils.

While the preceding discussion has emphasized the advance which has been made in wire coating and which is a prime feature of the present invention, the soluble polyamide polymers described hereinbefore are also suitable for the production of laminates, especially glass fiber laminates. Here, glass cloth is impregnated with a solution of the polyamide polymer, excess solution is doctored off and the impregnated cloth is subjected to mild heat in order to remove solvents without significantly advancing the resin by further removal of the phenol blocking agent as indicated hereinbefore. In order to minimize resin advance with solvent removal, it is desirable to employ solvents of minimum boiling point.

The impregnated and dried glass cloth is then positioned in a mold and subjected to heat and pressure which function to cure the resin by imide formation as discussed hereinbefore.

The production of fiberglass laminates in accordance with the invention is illustrated in the following example.

EXAMPLE 2

A glass cloth is dipped with the polyamide solution product of the previous example and excess solution is allowed to drain off. Each layer of impregnated cloth is prebaked 20 minutes at 300° F. to remove solvents and to provide a preimpregnated material which is dry to the touch. The dried layers are then stacked six layers deep and cured 25 minutes at 400° F. and 600 p.s.i. pressure in a mold followed by 5 minutes at 400° F. and 1500 p.s.i. pressure to provide a laminate which can be punched out as desired to provide electrical spacers and like equipment capable of withstanding prolonged exposure to elevated temperature.

The invention is defined in the claims which follow.

We claim:

1. A method of producing an organic solvent-soluble polyamide polymer capable of curing with the formation of imide linkages comprising reacting trimellitic anhydride and organic diisocyanate containing isocyanate groups as the sole functional group in molar proportions of from 1:0.95 to 1:1.4, said reaction being carried out in organic solvent solution at a temperature up to about 275° F. until from 0.6–1.2 molar proportions of carbon dioxide are liberated per mol of trimellitic anhydride, adding to the reaction product so-produced a monohydric phenol and heating the phenol-containing product to cause polymerization and the formation of a solvent-soluble polyamide polymer which is curable by baking with the product being insolubilized through the formation of imide groups.

2. A method as recited in claim 1 in which the molar proportion of trimellitic anhydride and organic diisocyanate does not exceed 1:1.2, and the reaction product which is produced is mixed with phenol.

3. A method as recited in claim 1 in which said solvent comprises N-methyl pyrrolidone.

4. A method as recited in claim 1 in which said diisocyanate is diphenylmethane-4,4'-diisocyanate.

5. A wire coating solution comprising an organic solvent-soluble polyamide polymer produced as recited in claim 1.

6. A method of producing an organic solvent-soluble polyamide polymer capable of curing with the formation of imide linkages comprising reacting trimellitic anhydride and organic diisocyanate containing isocyanate groups as the sole functional group in molar proportions of from 1:0.95 to 1:1.4, said reaction being carried out in organic solvent solution at a temperature up to about 275° F. until about one molar proportion of carbon dioxide is liberated per mol of trimellitic anhydride, adding to the reaction product so-produced a monohydric phenol and heating the phenol-containing product to cause polymerization and the formation of a solvent-soluble polyamide polymer which is curable by baking with the product being insolubilized through the formation of imide groups.

* * * * *

PO-1050
(5/69)

UNITED STATES PATENT OFFICE
CERTIFICATE OF CORRECTION

Patent No. 3,625,911          Dated December 7, 1971

Inventor(s) EDWARD G. REDMAN and JACK S. SKINNER

It is certified that error appears in the above-identified patent and that said Letters Patent are hereby corrected as shown below:

Column 2, in "Step 3", first part of formula should read as follows:

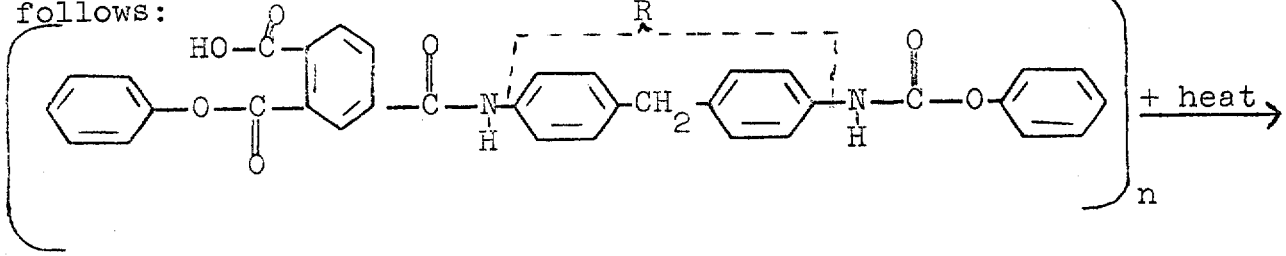

Column 3, line 27, "bis-2-isocyanato-ethyl-hexachloronorborn-5-ene-2,3-dicarboxylate" should be read --bis-2-isocyanato-ethyl-1-1,4,5,6,7,7-hexachloronorborn-5-ene-2,3-dicarboxylate--.

Signed and sealed this 23rd day of May 1972.

(SEAL)
Attest:

EDWARD M. FLETCHER, JR.
Attesting Officer

ROBERT GOTTSCHALK
Commissioner of Patents